United States Patent [19]
Caamaño

[11] Patent Number: 5,986,378
[45] Date of Patent: Nov. 16, 1999

[54] ELECTRIC MOTOR AND GENERATOR HAVING AMORPHOUS CORE PIECES BEING INDIVIDUALLY ACCOMMODATED IN A DIELECTRIC HOUSING

[75] Inventor: Ramon A. Caamaño, Gilroy, Calif.

[73] Assignee: Light Engineering Corporation, Gilory, Calif.

[ * ] Notice: This patent is subject to a terminal disclaimer.

[21] Appl. No.: 09/185,297

[22] Filed: Nov. 3, 1998

Related U.S. Application Data

[63] Continuation of application No. 09/111,249, Jul. 3, 1998, which is a continuation of application No. 08/963,290, Nov. 3, 1997, Pat. No. 5,814,914, which is a continuation of application No. 08/774,946, Dec. 27, 1996, Pat. No. 5,731,649.

[51] Int. Cl.⁶ ............................ H02K 21/12; H02K 37/12
[52] U.S. Cl. .............................. 310/216; 310/43; 310/45; 310/89; 310/179
[58] Field of Search .............................. 310/43, 45, 113, 310/179, 216, 218, 254, 258, 259, 264, 268; 29/596, 598, 609

[56] References Cited

U.S. PATENT DOCUMENTS

| | | | |
|---|---|---|---|
| 3,840,764 | 10/1974 | Burger | 310/185 |
| 4,187,441 | 2/1980 | Oney | 310/112 |
| 4,255,684 | 3/1981 | Mischler | 310/216 |
| 4,456,844 | 6/1984 | Yamamoto et al. | 310/87 |
| 4,547,713 | 10/1985 | Langley et al. | 310/254 |
| 4,578,610 | 3/1986 | Kliman et al. | 310/156 |
| 4,705,578 | 11/1987 | Lin et al. | 148/108 |
| 4,866,321 | 9/1989 | Blanchard et al. | 310/112 |
| 5,179,307 | 1/1993 | Porter | 310/68 B |
| 5,208,503 | 5/1993 | Hisey | 310/259 |
| 5,248,952 | 9/1993 | Bisbee | 336/213 |
| 5,350,988 | 9/1994 | Le | 318/618 |
| 5,363,002 | 11/1994 | Hernden et al. | 310/54 |
| 5,428,276 | 6/1995 | Carobolante et al. | 318/254 |
| 5,554,232 | 9/1996 | Fujimoto et al. | 148/304 |
| 5,633,545 | 5/1997 | Albrecht et al. | 310/67 R |

OTHER PUBLICATIONS

W. R. Mischler, "Test Results on a Low Loss Amorphous Iron Induction Motor", Jun. 1981, IEEE Transactions on Power Apparatus and Systems, vol. PAS–100, No. 6.

G. B. Kliman, "Permanent Magnet AC Disc Motor Electric Vehicle Drive", Mar. 1983, SEA Technical Paper Series, Soc. Of Automotive Eng., Paper No. 830111.

*Primary Examiner*—Thomas M. Dougherty
*Assistant Examiner*—Tran N Nguyen
*Attorney, Agent, or Firm*—Jay R. Beyer; Stephen C. Shear

[57] ABSTRACT

A device such as an electric motor, an electric generator, or a regenerative electric motor includes a rotor arrangement and a stator arrangement. The stator arrangement has a dielectric electromagnet housing and at least one energizable electromagnet assembly including an overall amorphous metal magnetic core. The overall amorphous metal magnetic core is made up of a plurality of individually formed amorphous metal core pieces. The dielectric electromagnet housing has core piece openings formed into the electromagnet housing for holding the individually formed amorphous metal core pieces in positions adjacent to one another so as to form the overall amorphous metal magnetic core. The device further includes a control arrangement that is able to variably control the activation and deactivation of the electromagnet using any combination of a plurality of activation and deactivation parameters in order to control the speed, efficiency, torque, and power of the device.

26 Claims, 7 Drawing Sheets

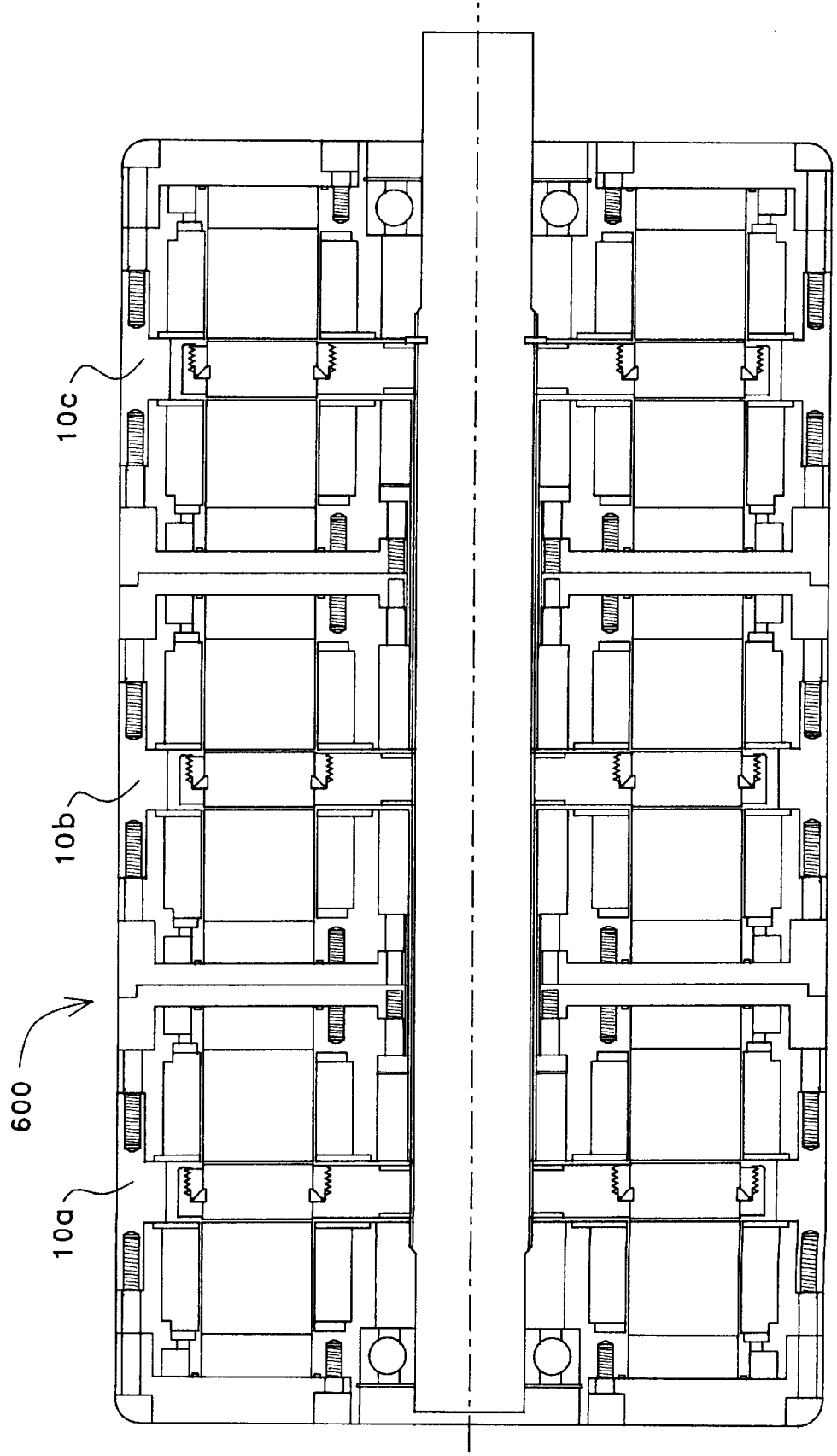

ELECTRIC MOTOR AND GENERATOR HAVING AMORPHOUS CORE PIECES BEING INDIVIDUALLY ACCOMMODATED IN A DIELECTRIC HOUSING

This is a Continuation application of copending prior application Ser. No. 09/111,249 filed on Jul. 3, 1998, which is a continuation of application Ser. No. 08/963,290 filed on Nov. 3, 1997 that issued as U.S. Pat. No. 5,814,914 on Sep. 29, 1998, which is a continuation of application Ser. No. 08/774,946 filed on Dec. 27, 1996 and now issued as U.S. Pat. No. 5,731,649 on Mar. 24, 1998.

BACKGROUND OF THE INVENTION

The present invention relates generally to electric motors, generators, and regenerative motors. The term regenerative motor is used herein to refer to a device that may be operated as either an electric motor or a generator. More specifically, the invention relates to an electric motor, generator, or regenerative motor including a stator arrangement which itself includes an electromagnet assembly having an amorphous metal magnetic core made up of a plurality of individually formed amorphous metal core pieces. The present invention also provides a control arrangement that is able to variably control the activation and deactivation of an electromagnet using any combination of a plurality of activation and deactivation parameters in order to control the speed, efficiency, power, and torque of the device.

The electric motor and generator industry is continuously searching for ways to provide motors and generators with increased efficiency and power density. For some time now, it has been believed that motors and generators constructed using permanent super magnet rotors (for example cobalt rare earth magnets and Neodymium-Iron-Boron magnets) and stators including electromagnets with amorphous metal magnetic cores have the potential to provide substantially higher efficiencies and power densities compared to conventional motors and generators. Also, because amorphous metal cores are able to respond to changes in a magnetic field much more quickly than conventional ferrous core materials, amorphous metal magnetic cores have the potential to allow much faster field switching within motors and generators, and therefore allow much higher speed and better controlled motors and generators than conventional ferrous cores. However, to date it has proved very difficult to provide an easily manufacturable motor or generator which includes amorphous metal magnetic cores.

Amorphous metal is typically supplied in a thin continuous ribbon having a uniform ribbon width. However, amorphous metal is a very hard material making it very difficult to cut or form easily, and once annealed to achieve peak magnetic properties, becomes very brittle. This makes it difficult and expensive to use the conventional approach to constructing a magnetic core. This conventional approach typically involves cutting individual core layers having a desired shape from a sheet of core material and laminating the layers together to form a desired overall magnetic core shape. The brittleness of amorphous metal also causes concern for the durability of a motor or generator which utilizes amorphous metal magnetic cores. Magnetic cores are subject to extremely high magnetic forces which change at very high frequencies. These magnetic forces are capable of placing considerable stresses on the core material which may damage an amorphous metal magnetic core.

Another problem with amorphous metal magnetic cores is that the magnetic permeability of amorphous metal material is reduced when it is subjected to physical stresses. This reduced permeability may be considerable depending upon the intensity of the stresses on the amorphous metal material. As an amorphous metal magnetic core is subjected to stresses, the efficiency at which the core directs or focuses magnetic flux is reduced resulting in higher magnetic losses, reduced efficiency, increased heat production, and reduced power. This phenomenon is referred to as magnetostriction and may be caused by stresses resulting from magnetic forces during the operation of the motor or generator, mechanical stresses resulting from mechanical clamping or otherwise fixing the magnetic core in place, or internal stresses caused by the thermal expansion and/or expansion due to magnetic saturation of the amorphous metal material.

Conventional magnetic cores are formed by laminating successive layers of core material together to form the overall core. However, as mentioned above, amorphous metal is difficult to cut or form easily. Therefore, in the past, amorphous metal cores have often been formed by rolling an amorphous metal ribbon into a coil with each successive layer of the material being laminated to the previous layer using an adhesive such as an epoxy. When in use in an electric motor or generator, this laminated construction restricts the thermal and magnetic saturation expansion of the coil of amorphous metal material and results in high internal stresses. These stresses cause magnetostriction that reduces the efficiency of the motor or generator as described above. Also, this construction places a layer of adhesive between each coil of the core. Since amorphous metal material is typically provided as a very thin ribbon, for example only a couple of mils thick, a significant percentage of the volume of the core ends up being adhesive material. This volume of adhesive reduces the overall density of the amorphous metal material within the laminated core, and therefore, undesirably reduces the efficiency of the core to focus or direct the magnetic flux for a given volume of overall core material.

The present invention provides a method and arrangement for minimizing the stresses on an amorphous metal magnetic core in an electric motor, generator, or regenerative motor. This method and arrangement eliminates the need for laminating the various layers of the amorphous metal thereby reducing the internal stresses on the material and increasing the density of the amorphous material within the overall core. Also, in order to take advantage of the high speed switching capabilities of the amorphous metal magnetic core material, the present invention provides control methods and arrangements that are able to variably control the activation and deactivation of the electromagnet of an electric motor, generator, or regenerative motor device including an amorphous metal magnetic core by using a combination of a plurality of different activation and deactivation parameters in order to control the speed, efficiency, torque, and power of the device.

SUMMARY OF THE INVENTION

As will be described in more detail hereinafter, a device such as an electric motor, an electric generator, or a regenerative electric motor is disclosed herein. The device includes a rotor arrangement, at least one stator arrangement, and a device housing for supporting the rotor arrangement and the stator arrangement in the predetermined positions relative to one another. The device housing also supports the rotor arrangement for rotation along a predetermined rotational path about a given rotor axis. The stator arrangement has at least one energizable electromagnet assembly including an overall amorphous metal magnetic core and an electric coil array which together define at least one magnetic pole piece. The overall amorphous metal magnetic core is made up of a plurality of individually formed amorphous metal core pieces. The stator arrangement also includes a dielectric electromagnet housing for supporting the electromagnet assembly such that the magnetic pole pieces are positioned adjacent the rotational path of the rotor arrangement. The dielectric electromagnet housing has core piece openings formed into the electromagnet housing for holding the individually formed amorphous metal core pieces in positions adjacent to one another so as to form the overall amorphous metal magnetic core.

In one preferred embodiment, the rotor arrangement has at least one rotor magnet with north and south poles and the rotor arrangement has an arrangement for supporting the rotor magnet for rotation about a given rotor axis such that at least one of the magnet's poles is accessible along a predetermined rotational path about the given rotor axis. In a preferred embodiment, the rotor magnet is a super magnet.

In some embodiments, the individually formed amorphous metal core pieces are amorphous metal windings formed from a continuous ribbon of amorphous metal. Preferably, the continuous ribbon of amorphous metal has a substantially constant ribbon width. The individually formed amorphous metal core pieces may have a variety of cross-sectional shapes including a circle, an oval, an egg shape, a toroidal ring, a triangle having rounded corners, and a trapezoid having rounded corners. Alternatively, the individually formed amorphous metal core pieces may be formed from individual strips of amorphous metal material stacked in an associated core piece opening of a core piece housing. Also, in some embodiments, any voids in the core piece openings of the electromagnet housing holding the amorphous metal core pieces are filled with a dielectric oil. Additionally, the amorphous metal core pieces may be oil impregnated.

In one embodiment, the stator arrangement includes a plurality of electromagnet assemblies, each having a plurality of pole pieces. Each of the pole pieces is an individually formed amorphous metal core piece. Furthermore, at least one of the individually formed amorphous metal core pieces is a toroidal ring forming an electromagnetic yoke magnetically coupling each of the pole pieces to one another. The toroidal ring electromagnetic yoke includes an annular or other such continuous surface defined by one continuous edge of the continuous ribbon of amorphous metal after the ribbon of amorphous metal has been wound about itself. Each of the pole pieces of the electromagnet assembly has a first end (defined by one continuous edge of the ribbon) positioned adjacent the predetermined rotational path of the rotor magnet. Also, each of the pole pieces of the electromagnet assembly has a second end (defined by the other continuous edge of the ribbon) positioned adjacent the annular surface of the toroidal ring electromagnetic yoke.

In another embodiment, the electromagnet of the stator arrangement includes a generally U-shaped overall amorphous metal magnetic core having two pole pieces. The two pole pieces are each individually formed amorphous metal core pieces. An additional individually formed amorphous metal core piece forms an electromagnetic yoke magnetically coupling the two pole pieces to one another such that the core pieces together define the U-shaped overall core.

In still another embodiment, the arrangement supporting the rotor magnet supports the rotor magnet such that both the north and south poles of the rotor magnet are accessible along different predetermined rotational paths about the given rotor axis. The electromagnet of the stator arrangement includes a generally C-shaped overall amorphous metal magnetic core having two pole pieces with each of the pole pieces positioned adjacent to a corresponding one of the predetermined rotational paths of the north and south poles of the rotor magnet. The overall magnetic core of the electromagnet assembly is a generally C-shaped overall amorphous metal magnetic core defining the two pole pieces such that each of the pole pieces is positioned adjacent to a corresponding one of the different predetermined rotational paths. The two pole pieces are each individually formed amorphous metal core pieces. Additional individually formed amorphous metal core pieces form an electromagnetic yoke magnetically coupling the two pole pieces to one another such that the core pieces together define the C-shaped overall core.

A method of making an amorphous metal magnetic core for an electromagnet of a device such as an electric motor, an electric generator, or a regenerative electric motor is also disclosed herein. The method includes the step of forming a plurality of individually formed amorphous metal core pieces, each having a desired core piece shape. A dielectric magnetic core housing including magnetic core piece openings that define the desired overall magnetic core shape is provided. The plurality of individually formed amorphous metal core pieces are assembled into the core piece openings of the dielectric magnetic core housing such that the dielectric core housing holds the core pieces adjacent to one another so as to form the desired overall magnetic core shape. In a preferred method, each core piece is wound into its final shape from a continuous ribbon of amorphous metal.

In accordance with another aspect of the present invention, a method and arrangement for controlling the rotational speed and input/output power and torque of a device such as an electric motor, an electric generator, or a regenerative electric motor is disclosed herein. The device includes a rotor supported for rotation along a predetermined rotor path about a given rotor axis. Preferably, the rotor includes at least one permanent super magnet. The device also includes a stator having a plurality of dynamically activatable and deactivatable electromagnet assemblies (also referred to herein merely as electromagnets) with amorphous metal magnetic cores. The electromagnets are spaced apart from one another adjacent to the predetermined rotor path such that movement of a particular point on the rotor (rotor point) from a given point adjacent one electromagnet (stator point) to a given point adjacent the next successive electromagnet (stator point) defines one duty cycle. A position detector arrangement determines the position and rotational speed of the rotor relative to the stator at any given time in a duty cycle and produces corresponding signals. A controller responsive to the signals controls the activation and deactivation of the electromagnets of the stator using predetermined device control settings such that, for each duty cycle, the controller is able to control any combination of a plurality of activation and deactivation parameters in order to control the speed, efficiency, and input/output power and torque of the device.

In a preferred embodiment, the activation and deactivation parameters include (i) the duty cycle activation time which is the continuous duration of time in which the electromagnet of the stator is activated (with either one polarity or the other) for each duty cycle, (ii) the start/stop points of the duty cycle activation time which are the times at which the duty cycle activation time starts and stops during the duty cycle relative to the rotational position of the rotor as it moves through the duty cycle from stator point to the next adjacent stator point, and (iii) the modulation of the duty cycle activation time which is the pulse width modulating of the electromagnet by activating and deactivating the electromagnet during what would otherwise be the continuous duty cycle activation time.

In another embodiment, the position detector arrangement includes an encoder disk supported for rotation with the rotor and also includes an array of optical sensors arranged in close proximity to the encoder disk. The encoder disk has a plurality of concentric tracks with spaced apart position indicating openings which are actually through-holes in the disk. Each of the optical sensors corresponds to and is optically aligned with an associated one of the concentric tracks such that each sensor is able to detect the presence of the position indicating openings defining its associated concentric track so as to be able to detect the position of the rotor relative to the stator. Preferably these openings are sized and positioned to represent a digital byte of rotor positional information with each track contributing one bit of the overall digital byte. In this way, during startup of the motor/generator device, the position of the rotor can be precisely determined.

In still another embodiment, the controller further includes a counter arrangement capable of counting in increments of time which allow each duty cycle to be divided into a multiplicity of time periods which the controller uses to control when to activate and deactivate the electromagnet.

In accordance with another aspect of the present invention, a method and arrangement for conditioning the electrical output of an electric generator driven by a input drive device is disclosed. The generator includes a stator assembly having at least one dynamically activatable and deactivatable stator coil and a rotor assembly. A position detector arrangement determines the position and rotational speed of the rotor assembly relative to the stator assembly at any given time and produces corresponding signals. A controller responsive to the signals variably controls the activation and deactivation of the stator coil such that the electrical output of the generator is conditioned to a desired electrical output without requiring the use of additional electrical power conditioning devices. In one embodiment, the input drive device is a wind mill. Furthermore, the controller may use a portion of the electrical power generated by the generator to drive the generator as an electric motor. The generator may be driven as an electric motor in a way which reduces the amount of resistance the generator places on the input drive device or in a way which increases the amount of resistance the generator places on the input drive device.

BRIEF DESCRIPTION OF THE DRAWINGS

The features of the present invention may best be understood by reference to the following description of the presently preferred embodiments together with the accompanying drawings in which:

FIG. 12 is a diagrammatic cross-sectional view of a multiphase device designed in accordance with the present invention.

DETAILED DESCRIPTION OF THE PREFERRED EMBODIMENTS

Figure 1:
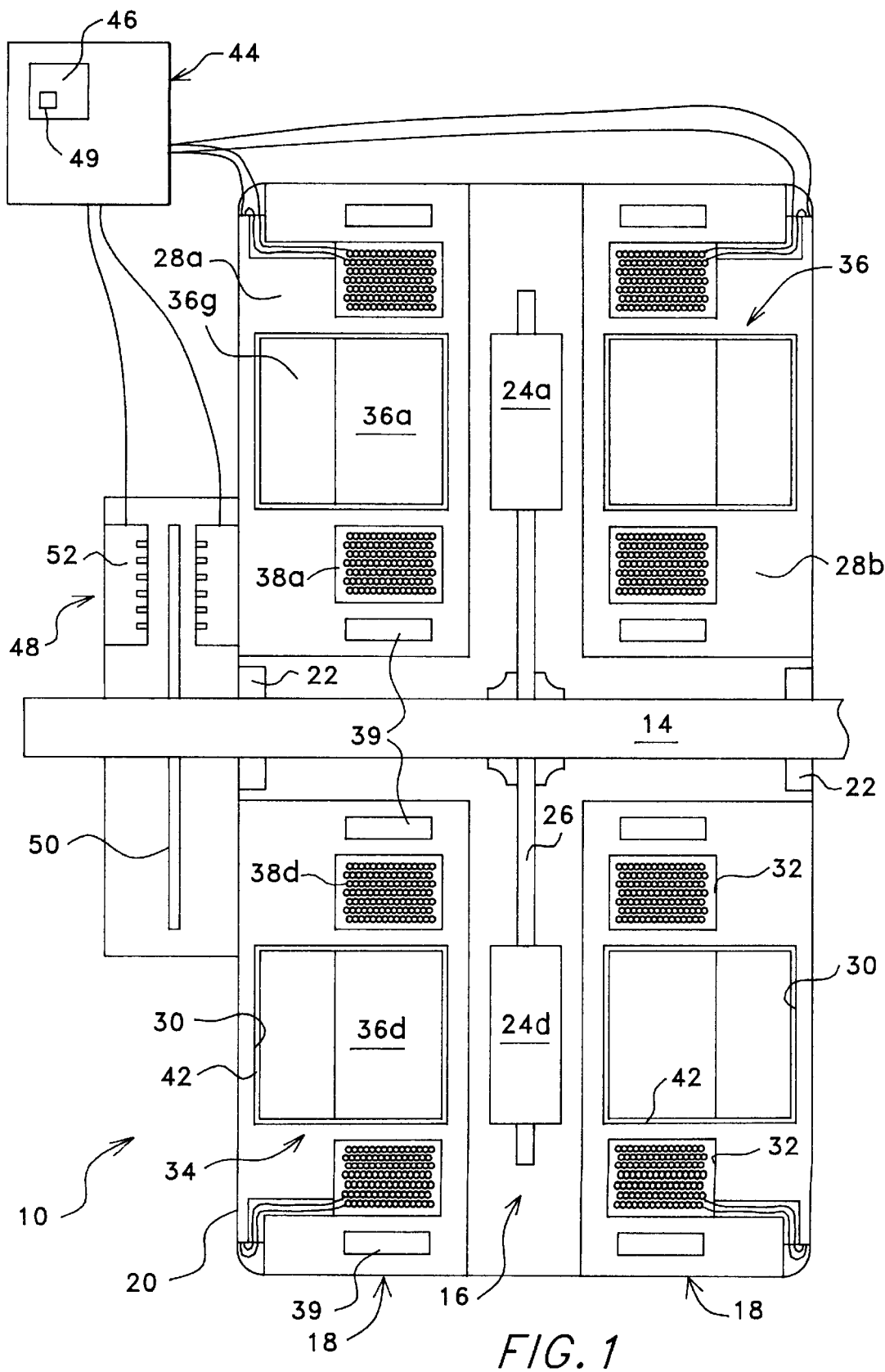
FIG. 1 is a diagrammatic cross-sectional view of a device designed in accordance with the present invention including a rotor arrangement, a stator arrangement having a stator housing and an overall amorphous metal magnetic core made up of individually formed amorphous metal core pieces, and a control arrangement having an encoder disk.

Turning to the drawings, wherein like components are designated by like reference numerals throughout the various figures, attention is initially directed to FIGS. 1–3B. FIG. 1 illustrates a cross sectional view of a device 10 designed in accordance with the present. Although device 10 will be referred to as an electric motor or an electric generator at various times throughout this description, it should be understood that device 10 may take the form of a motor, a generator, an alternator, or a regenerative motor depending on the requirements of the application in which the device is used. For purposes of this description, the term regenerative motor refers to a device that may be operated as either an electric motor or an electric generator. Also, although device 10 will in most cases be described as a DC brushless motor, it should be understood that it may take the form of a wide variety of other types of motors and/or generators and still remain within the scope of the invention. These other types of motors and/or alternators/generators include, but are not limited to, DC synchronous devices, variable reluctance or switched reluctance devices, and induction type motors.

As best shown in FIG. 1, device 10 includes a shaft 14, a rotor arrangement 16, a stator arrangement 18, and a device housing 20. Device housing 20 supports shaft 14 for rotation about the longitudinal axis of the shaft using bearings 22 or any other suitable and readily providable arrangement for supporting a shaft for rotation. Rotor arrangement 16 is fixed to shaft 14 for rotation with the shaft about the longitudinal rotational axis of shaft 14. Stator arrangement 18 is supported by device housing 20 such that the stator arrangement is positioned adjacent the rotational path of the rotor arrangement.

Figure 2:
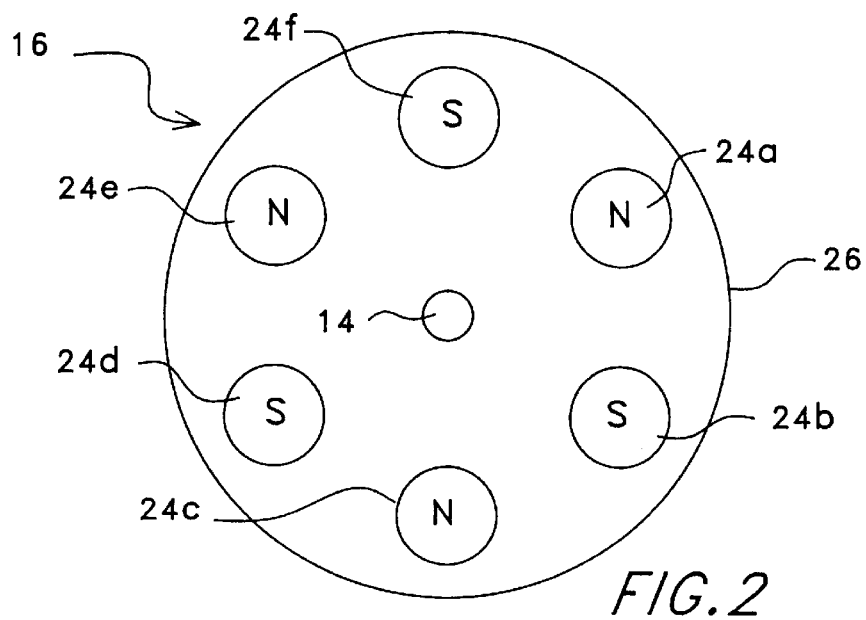
FIG. 2 is a diagrammatic plan view of the rotor arrangement of the device of FIG. 1.

Referring now to FIG. 2, which is a plan view of one preferred embodiment of rotor arrangement 16, rotor arrangement 16 will be described in more detail. In this embodiment, rotor arrangement 16 is a disk or axial type rotor including six radially spaced apart permanent super magnets 24a–f (for example cobalt rare earth magnets), each having opposite ends defining north and south poles. Magnets 24a–f are supported for rotation about the axis of shaft 14 by a rotor disk 26 or any other suitable arrangement such that the magnetic poles of magnets 24a–f are accessible along two predetermined rotational paths about the shaft axis and adjacent the rotor arrangement. They are oriented relative to one another such that on each side of the rotor disk, the magnets present alternating north and south poles as shown in FIG. 2.

Although magnets 24a–f have been described as being permanent super magnets, this is not a requirement. Alternatively, the magnets may be other magnetic materials, or, in some cases may be electromagnets. Also, although the rotor arrangement has been described as being a disk or axial type rotor, this is not a requirement. Instead, the rotor may take on a wide variety of specific configurations such as a barrel or radial type rotor with the magnets being positioned on the outer circumference of the barrel or radial type rotor. Although the rotor has been described as including six magnets, it should be understood that the rotor may include any number of magnets and still remain within the scope of the invention. And finally, although the rotor arrangement has been described as including magnets, this is not a requirement. For example, in the case of an induction motor, rotor arrangement 16 would not include magnets 24a–g. Instead, as would be understood by those skilled in the art, rotor disk 26 would be constructed from an iron based material or some other magnetic material to form a magnetic rotor core which is driven by a rotating magnetic field created by the switching of the stator arrangement.

As best shown in FIG. 1, in the embodiment being described, stator arrangement 18 includes two stator housings 28a and 28b with the stator housings being positioned adjacent opposite sides of rotor arrangement 16. Stator housings 28a and 28b are mirror images of one another, and therefore, only stator housing 28a will be described in detail. Stator housing 28a is formed from a dielectric material such as, but not limited to, a high strength composite or plastic material. Any appropriate material may be used to form the stator housing so long as it is dielectric and able to properly support all of the associated components making up stator arrangement 18.

Figure 3A:
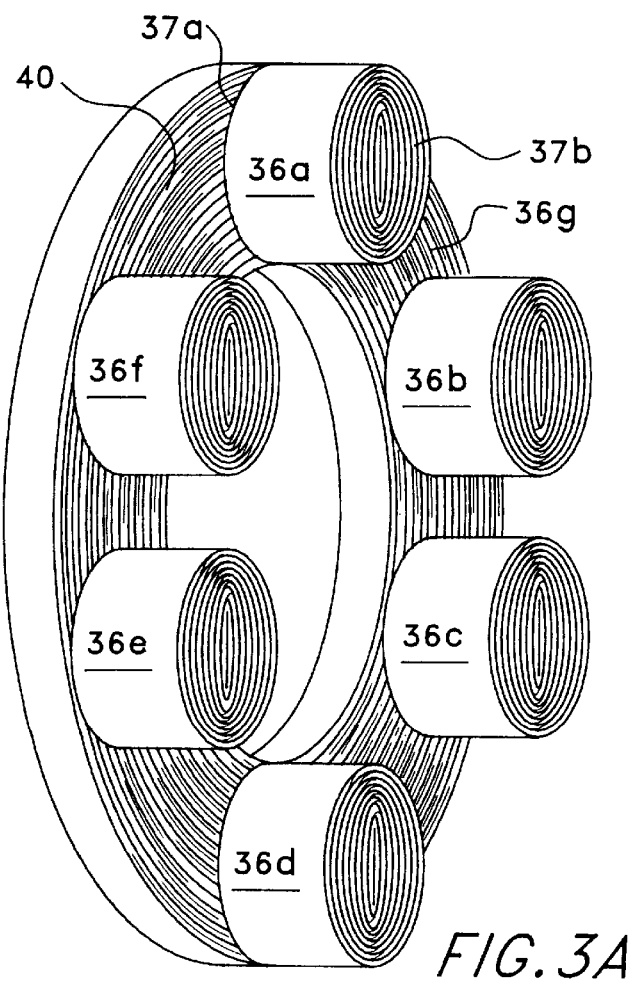
FIG. 3A is an orthographic diagrammatic view of one embodiment of an overall amorphous metal magnetic core forming part of the stator arrangement of the device of FIG. 1.

In accordance with the present invention, stator housing 28a has a plurality of openings including core piece openings 30 and coil openings 32 formed into the housing for supporting a dynamically activatable and deactivatable electromagnet assembly 34. The electromagnet assembly 34 includes an overall amorphous metal magnetic core 36 and a coil array 38. Coil array 38 is supported in coil openings 32. Also in accordance with the invention, overall amorphous metal core 36 is made up of a plurality of individually formed amorphous metal core pieces 36a–g some of which form magnetic pole pieces as best shown in FIG. 3A. Stator housing 28a supports electromagnet assembly 34 such that the pole pieces of the electromagnet assembly are held adjacent to one of the predetermined rotational paths of the magnetic poles of magnets 24a–f on rotor arrangement 16 as best shown in FIG. 2.

FIG. 3A illustrates the specific configuration of overall amorphous metal core 36 for the particular embodiment shown in FIG. 1. Each individual core piece 36a–g is formed by winding a continuous ribbon of amorphous metal material into the desired shape. In the case of core pieces 36a–f, the core piece shape is a generally cylindrical shape such that the opposing continuous edges of each of these core pieces define opposite ends 37a and 37b of the core piece. However, in the case of core piece 36g, the core piece shape is a toroidal ring having an annular surface 40 defined by one continuous edge of the continuous amorphous metal ribbon wound to form toroidal ring core piece 36g. In either case, for this embodiment, the continuous amorphous metal ribbon is not cut, etched, or otherwise machined other than initially cutting the continuous ribbon of amorphous metal to the desired length required to form the desired core piece shape. Each of the cylindrical shaped core pieces 36a–f forms a pole piece of overall core 36 with one end 37a of each cylindrical core piece being positioned against annular surface 40 of toroidal ring shaped core piece 36g, and the other end 37b projecting out away from annular surface 40. Toroidal ring core piece 36g acts as a magnetic yoke preventing leakage of magnetic flux and magnetically coupling each of the cylindrical core pieces 36a–f.

Figure 3B:
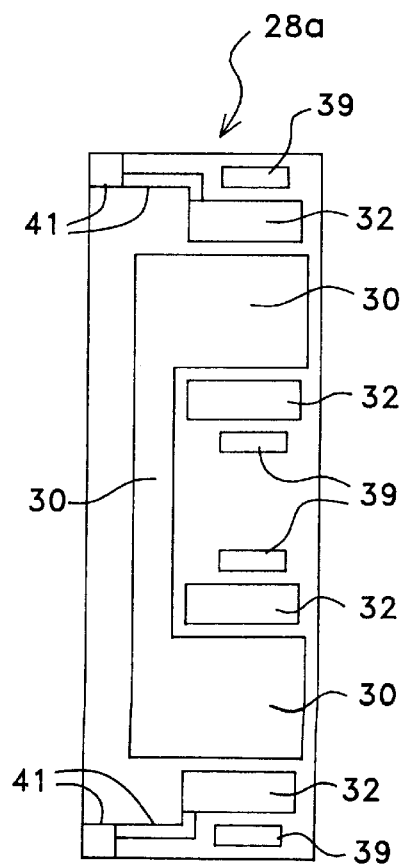
FIG. 3B is a diagrammatic cross-sectional view of the stator housing of FIG. 1.

FIG. 3B illustrates stator housing 28a apart from, but designed to contain, core 36 of FIG. 3A. Note specifically the various core piece openings 30 and coil openings 32. Stator housing 28a also includes coolant openings 39 and wire raceway openings 41. Using coolant openings 39, a coolant fluid may be circulated through stator housing 28a to prevent excessive heat buildup in stator housing 28a, coil array 38, and core 36. Coolant openings may be formed in any appropriate location within the stator housing in order to provide cooling for the device. Wire raceway openings 41 are used to run wires which interconnect coil array 38. Although FIG. 3B illustrates one specific configuration of the stator housing which is designed to house the core pieces illustrated in FIG. 3A, it should be understood that the stator housing may take on a wide variety of configurations which vary depending on the specific core design.

As best shown in FIGS. 1, 3A, and 3B, individually formed core pieces 36a–g are supported within core piece openings 30 of stator housing 28a such that they are held in their respective positions relative to one another. Because core piece openings 30 are formed in stator housing 28a to have the proper shape for supporting each of the various individually formed core pieces 36a–f, core pieces 36a–f may be formed by winding the amorphous metal ribbon material without laminating the layers of the winding. This allows each individually formed core piece to thermally expand and/or expand due to magnetic saturation, causing the winding to slightly uncoil, without causing internal stress within the overall core or within any of the individually formed core pieces. This arrangement substantially reduces the problems caused by magnetostriction described in the background of the invention. Also, this arrangement eliminates the need to laminate the core pieces and therefore eliminates the volume of space within the overall core which is taken up by the laminating material. Because of this, a greater amount of amorphous metal material is able to be placed into a given volume which improves the efficiency at which a magnetic core is able to direct or focus magnetic flux. At the same time, each stator housing holds the pole pieces 36a–f in direct contact with yoke 36g so that the entire core, from a functional standpoint, approximates a single integrally formed core. Stator housing 28a may also completely encase overall amorphous metal core 36 creating a sealed enclosure which prevents corrosion of the core pieces.

In the embodiment shown in FIG. 1, any voids in core piece openings 30 that are not filled by core pieces 36a–g are filled with a dielectric oil 42 and core piece openings 30 are sealed to maintain the oil within the voids. This oil filling of the core piece openings acts as a cushion to help prevent damage to the amorphous metal material as it is subjected to the large and varying magnetic forces associated with the motor. This oil filling also helps to thermally equalize the stator arrangements and may be used to improve the heat dissipating characteristics of the overall device. Also, amorphous metal core pieces 36a–g are oil impregnated. This allows the windings of the amorphous metal core pieces to more easily expand due to magnetic saturation and thermal expansion of the amorphous metal material further reducing stresses that may cause magnetostriction. Although, the core piece openings described above are oil filled and the core pieces are oil impregnated, this is not a requirement. The invention would equally apply to devices which use magnetic cores made up of individually formed amorphous metal magnetic core pieces supported in openings of a housing to form an overall amorphous metal magnetic core shape regardless of whether or not the openings were filled with oil and the core pieces were oil impregnated.

Device 10 is a brushless, synchronous device in which the coils making up electromagnet coil array 38 within state housing 28a are all electrically connected such that they are activated and deactivated at the same time. In the embodiment shown in FIG. 1, coil array 38 includes six pole piece coils, two of which are illustrated in FIG. 1 as coils 38a and 38d. Coil array 38 may be epoxied or otherwise fixed into position in order to add to the overall structural integrity of the stator arrangement. Each coil is positioned around a corresponding one of core pieces 36a–f, two of which are illustrated in FIG. 1 as core pieces 36a and 36d. Coil array 38 is wound such that the projecting ends of the pole pieces formed by magnetic core pieces 36a–f form alternating north and south poles when coil array 38 is activated. Toroidal ring core piece 36g acts as a magnetic yoke redirecting the magnetic flux associated with the ends of core pieces 36a–f that are adjacent to toroidal ring core piece 36g to the adjacent pole pieces of the opposite polarity. When the device is operated as an electric motor, switching the direction of current flow through coil array 38 reverses the polarity of each of the pole pieces of electromagnet assembly 34. As will be described in more detail hereinafter, in the case of a generator, switching the way in which the electromagnets are connected to a load controls the power output and the condition of the electricity produced by the generator. This arrangement allows the alternating north and south poles of electromagnet assembly 34 of stator arrangement 18 to controllably interact with the alternating north and south poles of permanent magnets 24a–f of rotor arrangement 16.

Device 10 also includes a control arrangement 44 for activating and deactivating coil array 38 with alternating polarity. Control arrangement 44 includes a controller 46 which may be any suitable and readily providable controller that is capable of dynamically activating and deactivating electromagnet assembly 34 with varying polarity. Preferably, controller 46 is a programmable controller capable of activating and deactivating electromagnet assembly 34 at a rate of speed much higher than is typically done in conventional electric motors and generators. Because of the inherent speed at which the magnetic field may be switched in an amorphous metal core, for each duty cycle of the device, the stator arrangement of device 10 allows controller 46 to use any combination of a plurality of activation and deactivation parameters to control the rotational speed, power, and torque output of device 10. For purposes of this description, one duty cycle is defined as the movement of a particular point of the rotor from a given stator point adjacent one electromagnet pole piece of the stator arrangement to a given stator point adjacent the next successive electromagnet pole piece of the stator arrangement, as mentioned previously.

Still referring to FIG. 1, control arrangement 44 also includes a position detector arrangement 48 for determining the position and rotational speed of rotor arrangement 16 relative to stator arrangement 18 at any given time for each duty cycle and for producing corresponding signals. Detector arrangement 48 includes an encoder disk 50 supported on shaft 14 for rotation with rotor arrangement 16. Detector arrangement 48 also includes an array of optical sensors 52 positioned adjacent the encoder disk.

Figure 4:
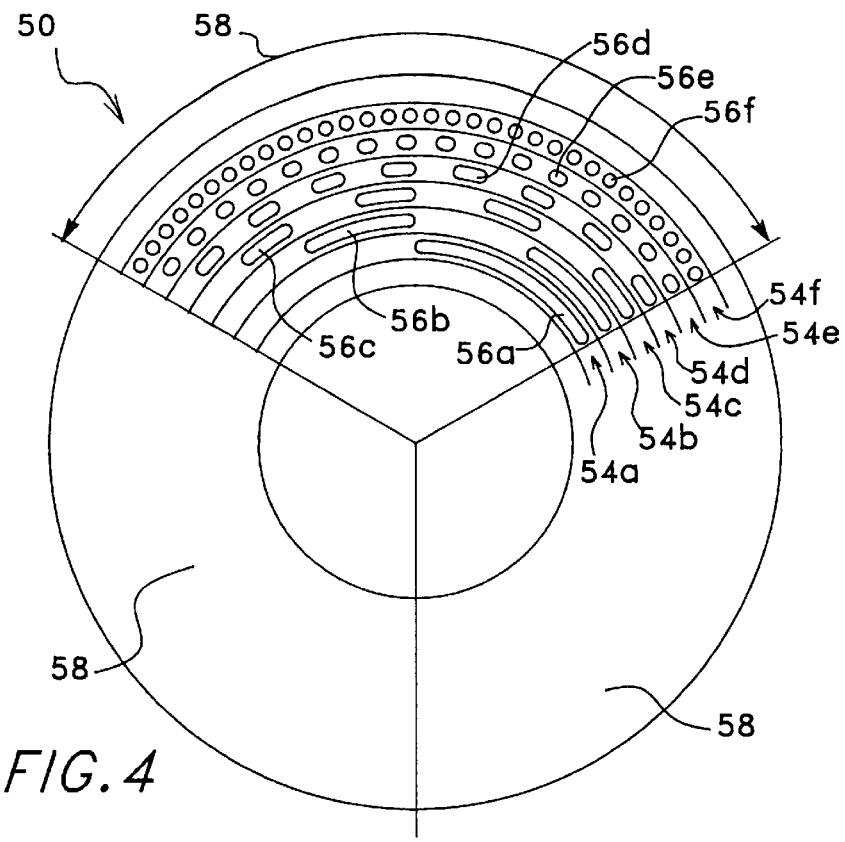
FIG. 4 is a diagrammatic plan view of the encoder disk of the device of FIG. 1.

As illustrated in FIG. 4, which is a plan view of encoder disk 50, encoder disk 50 includes a plurality of concentric tracks 54 with position indicating openings 56 formed into each of the tracks. In this embodiment, disk 50 includes six concentric tracks 54a–f. Disk 50 is divided into three one hundred and twenty degree arc, pie shaped sections 58, each of which are identical to one another. Each section 58 is associated with a pie shaped section of the rotor arrangement extending from a given point on a first rotor magnet having a particular polarity to a corresponding point on the next successive magnet having the same polarity (i.e. from one south pole past a north pole to the next south pole). Inner track 54a has one long opening 56a extending half (a sixty degree arc) of the length of track 54a in each section 58. In this case, each of these openings corresponds to one duty cycle of the device and the three openings together are aligned with every other one of the six rotor magnets (i.e. the three magnets having the same polarity on each given side of the rotor disk). Within each section, each successive track has twice as many openings which are half as long as the openings in the previous track. That is track 54b has two openings 56b within each section, track 54c has four openings 56c and so on with the outside track having thirty two openings, each having an arc of one and seven eighths of a degree.

Optical sensor array 52 includes six optical sensors with each sensor corresponding to and positioned in optical alignment with one of the concentric tracks on encoder disk 50. Array 52 is positioned adjacent encoder disk 50 such that optical sensors detect the presence of openings 56. With each of the optical sensor providing one bit of information, array 52 is able to provide controller 46 with a binary word (a byte) which identifies the position of the rotor arrangement within less than a two degree arc. Using the most significant bit, that is the sensor associated with track 54a, controller 46 is also able to determine the location of the alternating north and south poles of the magnets since the openings 56a of track 54a corresponds to every other magnet on the rotor disk as described above.

Controller 46 also includes a counter arrangement 49 capable of counting in increments of time which allow each duty cycle (sixty degree arc) to be divided into a multiplicity of time periods or counts, for example, 1600 counts per duty cycle when the device is rotating at a predetermined maximum speed. This corresponds to one hundred counts for each opening 56f, or, in other words, one hundred times the resolution provided by the encoder disk. For illustrative purposes, for a high speed motor capable of operating at 20,000 RPM, this would require a counter arrangement or clock capable of operating at 3.2 million counts per second or a 3.2 MHz clock. Although only one specific clock speed has been described in detail, it should be understood that the present invention would equally apply regardless of the specific clock speed of the counter arrangement.

Controller 46 is arranged to be able to activate or deactivate electromagnet assembly 34 at any predetermined count of counter arrangement 49. This provides extremely precise control of the activation and deactivation of the electromagnets. Although the example of an operating speed of 20,00 RPM is used, it is to be understood that this is not an upper limit. Because of the extremely fast switching capability of the amorphous metal stator arrangement and the precise activation and deactivation control of the electromagnets provided by the control arrangement described above, motor and generator devices designed in accordance with the invention are capable of providing extremely high speed devices with rotational speeds of 50,000 RPM or even greater than 100,000 RPM. The present invention also provides a stator arrangement configuration and rotor arrangement configuration that are capable of withstanding the extreme centrifugal forces that would be generated by these extremely high speed devices.

In order to allow controller 46 to discretely detect the presence of the openings of the various tracks in encoder disk 50, the openings in the various tracks are slightly staggered relative to one another such that the different optical sensors of array 52 are not trying to indicate the detection of the beginning of an opening for different tracks at the same precise time. This encoding configuration is commonly referred to as gray code and is intended to prevent errors by the controller caused by very slight inaccuracies in the locations of the position indicating openings.

Referring back to FIG. 1, now that the various components making up device 10 have been described, the operation of the device in various modes will be described in more detail. Because the amorphous metal magnetic core material is able to switch it's magnetic field extremely quickly and because control arrangement 44 is able to activate and deactivate electromagnet assembly 34 at extremely precise times, control arrangement 44 of the present invention allows controller 46 to use any combination of a plurality of electromagnet assembly activation and deactivation parameters in order to control the speed, efficiency, torque, and power of the device. These parameters include, but are not limited to, the duty cycle activation time, the start/stop points of the duty cycle activation time, and the modulation of the duty cycle activation time. The activation and deactivation parameters will be described in more detail with reference to FIGS. 5A–C, which are graphs showing the activation/deactivation status of electromagnet assembly 34 for two consecutive duty cycles D1 and D2.

The electromagnet assembly is activated having alternating north and south polarity for each of the pole pieces making up the electromagnet assembly. For any given stator pole piece, duty cycle D1 corresponds to the time it takes for the rotor assembly to rotate from a point where a north pole of one of the rotor magnets is adjacent to and lined up top dead center with the given stator pole piece to the time the south pole of the next successive rotor magnet is adjacent to and lined up top dead center with the given stator pole piece. As indicated by the reference letter N, the electromagnet assembly is activated during duty cycle D1 such that the given stator pole piece acts as a north pole. Duty cycle D2 corresponds to the time it takes for the rotor assembly to rotate from the point where the south pole of the rotor magnet at the end of duty cycle D1 is lined up top dead center with the given stator pole piece to the time the north pole of the next successive rotor magnet is lined up top dead center with the given stator pole piece. As indicated by the reference letter S, the electromagnet assembly is activated during duty cycle D2 such that the given stator pole piece acts as a south pole.

Figure 5A:
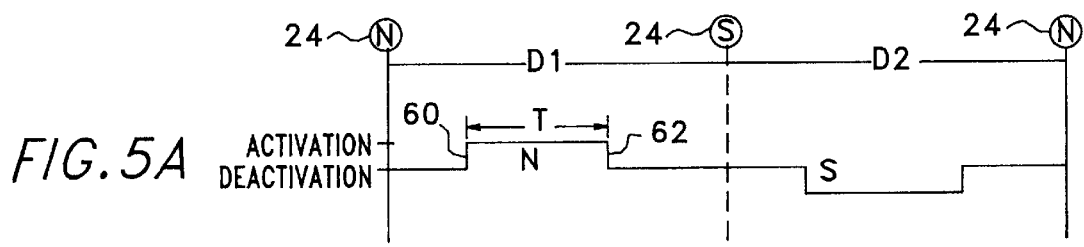
FIG. 5 is a graph illustrating various activation and deactivation parameters which the control arrangement of the device of FIG. 1 may use to control the device of FIG. 1.
Figure 5B:
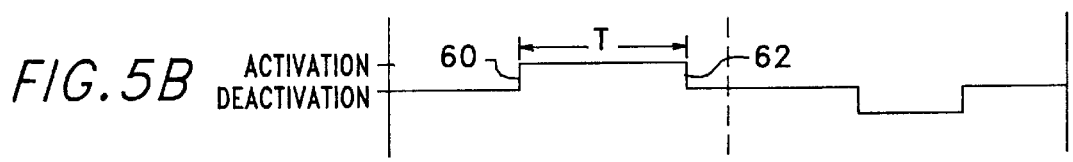
Figure 5C:
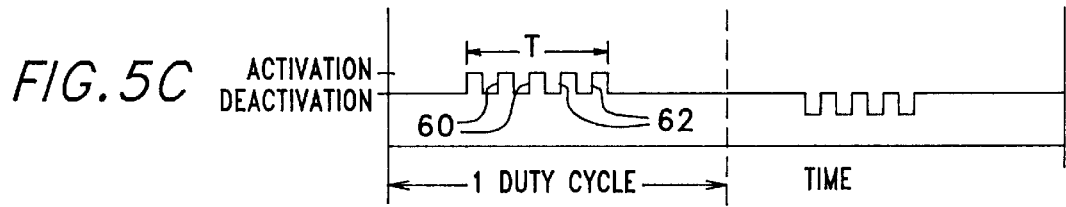

As shown in FIG. 5A, the duty cycle activation time is the continuous duration of time in which the electromagnet assembly 34 of the stator arrangement is activated for a given duty cycle. The duty cycle activation time is indicated by the letter T in FIGS. 5A–C. The start/stop points of the duty cycle activation time are the times at which the duty cycle activation time starts (indicated by reference numeral 60) and stops (indicated by reference numeral 62) during the duty cycle relative to the rotational position of the rotor. As illustrated in FIG. 5B, the start/stop time may be changed while keeping the duty activation time T constant or it may be changed while, at the same time, changing the length of duty activation time T. And finally, the modulation of the duty cycle activation time is the pulse width modulating of electromagnet assembly 34 during the duty activation time T between its start and stop points. As illustrated in FIG. 5C, this is done by activating and deactivating electromagnet assembly 34 during what would otherwise be the continuous duty cycle activation time T. While the pulse width modulation is shown as equal ON and OFF pulses, the ON pulses may be different in duration than the OFF pulses. Furthermore, each set of pulses can vary among themselves to provide a desired overall activation time within the time T. In accordance with the invention, the speed, efficiency, and power and torque input/output of device 10 may be controlled by using control arrangement 44 to activate and deactivate electromagnet assembly 34 using any combination of these parameters, or any other predetermined activation and deactivation parameters in some combination.

When device 10 is stopped, controller 46 uses encoder disk 50 and optical sensor array 52 to determine the relative position of rotor arrangement 16 relative to stator arrangement 18. In the case of an electric motor, controller 46 uses the position information to start the rotation of the rotor arrangement by energizing electromagnet assembly 34 such that pole pieces 36 have the appropriate polarity to start the rotation of the motor in the desired direction. Controller 46 activates and deactivates electromagnet assembly 34 such that the polarity of each pole piece reverses for each successive duty cycle. Once the motor is rotating at a sufficient speed, controller 46 only uses the outer tracks of encoder disk 50 to determine the rotational speed of the rotor assembly relative to the stator assembly for calibrating counter arrangement 49. Controller 46 continues controlling device 10 by using counter arrangement 49 and the signals produced by encoder disk 50 to select and use predetermined device control settings which may be programmed into or otherwise provided to controller 46 to control the activation and deactivation of electromagnet assembly 34. Because control arrangement 44 is able to activate or deactivate electromagnet assembly 34 at any one of the counts of counter arrangement 49, control arrangement 44 is able to very precisely control the speed, efficiency, torque, and power of device 10 using any combination of the above described activation and deactivation parameters.

The precision, speed, and flexibility of control arrangement 44 allows a device designed in accordance with the present invention to be used for a wide variety of applications. Also, by using super magnets in the rotor assembly and amorphous metal magnetic cores, the device is capable of very high power densities and very high rotational speeds compared to conventional electric motors and generators. These advantages allow a device designed in accordance with the present invention to be used in ways that have not been previously possible or practical using conventional devices.

In a first example, one preferred embodiment of the invention is an electric motor for use in a numeric control machine tool application in which multiple tools are driven using the same spindle and chuck. In the case where the electric motor directly drives the spindle and the motor and spindle are supported for movement over a work surface, the spindle and overall tool would not need to be constructed nearly as heavily because of the light weight and high power density of the motor. Also, because of the flexibility of the control arrangement of the motor, the motor may be programmed for a wide variety of specific operations. For instance, the tool may initially be used as a high speed, relatively low power router rotating at for example 20,000 RPM. Then, by driving the motor in the opposite direction, the motor and spindle may be stopped very quickly so that a different tool may be automatically inserted into the chuck. If, for example, the next operation is a lower speed, but higher power requirement drilling operation, the control arrangement of the motor may be programmed to provide the desired speed, efficiency, power, and torque output. Using a motor in accordance with the present invention, a much wider range of motor speed, power, and torque settings are available compared to conventional motors.

Figure 6:
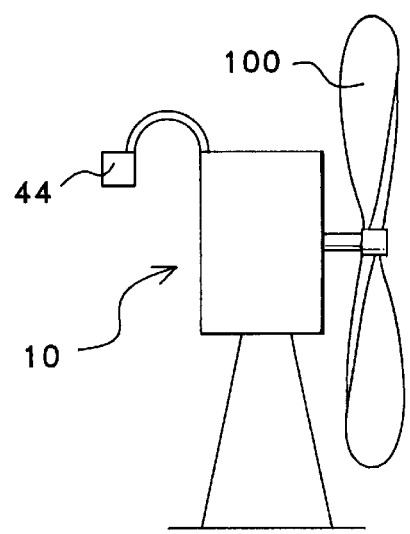
FIG. 6 is a diagrammatic view of one embodiment of the invention in which a windmill drives a generator designed in accordance with the invention.

In another application illustrated in FIG. 6, device 10 is used as a generator which is driven by a windmill 100. In this situation, control arrangement 44 is configured to switch the way electromagnet assembly 34 is activated and deactivated in order to vary the power generated by device 10 depending on the power input available from windmill 100. This arrangement allows the generator to operate in a much wider range of operating conditions than is possible using conventional generators.

Typically windmill generators are configured to have a predetermined electrical output. As the wind comes up, the generator is not able to operate until the wind speed reaches a minimum operating speed. Since typical windmills are designed to operate at a point near the average wind speed for the area in which they are installed, this means that the windmill is not able to generate any power when the wind is below the minimum operating speed of the windmill. As the wind increases beyond the designed operating speed, the windmill must be feathered or have a breaking mechanism to waste some of the wind energy in order to prevent the windmill from over speeding. In some cases, the windmill must be shut down altogether in very high wind situations to avoid damage or over heating of the breaking mechanism. Therefore, in high wind situations or very high wind situations, much or all of the available wind energy goes to waste because the windmill generator is only able to generate its predetermined electrical output.

In accordance with the invention, device 10 may be designed to have a maximum power output which is more in line with the high wind energy available to the windmill rather than the average wind energy. In this situation, when the wind is at it's average wind speed, control arrangement 44 connects and disconnects electromagnet assembly 34 such that device 10 has a power output substantially lower than it's maximum power output. In fact, in low wind situations, device 10 may be used as an electric motor in order to get the windmill started. Once rotating at an appropriate speed, device 10 may be operated as a generator with a very low power output. As the wind increases to higher than average wind speeds, control arrangement 44 simply activates and deactivates electromagnet assembly 34 such that the power output increases to match the energy input of the wind. In very high wind situations in which the wind energy is even greater than the maximum power output of device 10, device 10 may be operated a certain fraction of the time as an electric motor driving the windmill in the opposite direction to act as a brake. This overall configuration allows the windmill to operate and produce output in a much wider range of wind conditions than is possible using conventional generators.

The power output of device 10 is controlled by activating and deactivating electromagnet assembly 34 as described above. Any combination of activation and deactivation parameters including the duty cycle activation time, the start/stop points of the duty cycle activation time, and the modulation of the duty cycle activation time may be used to control the power output of device 10. By controlling these activation and deactivation parameters, a very wide range of power outputs may be achieved for any given sized device. Also, because device 10 may be driven in either direction as an electric motor by energizing electromagnet assembly 34 with the appropriate polarity for any desired fraction time during it's operation, the device is able to reduce or increase the amount of force required to turn the device as a generator. Therefore, the device is able to act as a generator with an extremely wide range of power outputs.

When device 10 is acting as a generator, the flexibility provided by control arrangement 44 also allows device 10 to be arranged to condition the power output of device 10 without requiring the use of additional power conditioning devices. Using the example of the windmill application illustrated in FIG. 6, as described above, control arrangement 44 is able to activate and deactivate electromagnet assembly 34 in order to control the power output of device 10. Because of this control arrangement 44 is able to control the speed at which the windmill operates. Also, control arrangement 44 is able to control the activation and deactivation parameters as described above. This allows control arrangement 44 to be configured to activate and deactivate the electromagnet assembly such that the output of device 10 is conditioned to a desired electrical output without requiring the use of additional electrical power conditioning devices. This is done by controlling the speed of the device and activating and deactivating the electromagnet assembly at the appropriate times to create an electrical output conditioned to a desired electrical output. In the case where the output is desired to be pulsed DC, as would be the case when charging batteries, an H bridge controller can convert the AC output of the device to pulsed DC. This is known as "active rectification".

Figure 7:
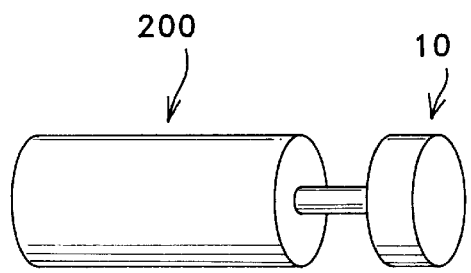
FIG. 7 is a diagrammatic view of another embodiment of the invention in which a turbine engine drives a generator designed in accordance with the invention.

As illustrated in FIG. 7, another application in which the inventive device is well suited is a gas turbine driven generator application. Because of the extremely high rotational speeds of turbine engines, conventional generators are typically connected to a turbine engine using reduction gears that substantially reduce the rotational speed at which the generator is driven by the turbine engine. These reduction gear arrangements increase the cost of the overall system and cause energy loses that reduce the overall efficiency of the combination. In accordance with the present invention, a generator designed as described above is directly driven by a gas turbine without the use of reduction gears or any other arrangement for reducing the rotational speed at which the turbine engine drives the generator. As shown in FIG. 7, device 10 is directly driven by turbine engine 200. Device 10 may also be used as a starter motor for the turbine engine. As also described above, because of the extremely high speed at which the amorphous metal magnetic core of device 10 is able to respond to changes in the magnetic field, and because of the extremely fast switching capabilities of control arrangement 44, device 10 is able to operate effectively at extremely high rotational speeds. This allows device 10 to be directly driven by turbine engine 200, and eliminates the need for any reduction gears or other arrangements for reducing the rotational speed at which the turbine engine drives device 10.

The disk or axial type device configuration described above provides a compact overall package which may be designed to withstand extremely high centrifugal forces. This allows a device of this configuration to operate at extremely high rotational speeds and therefore offer an extremely high power output for a given size device. In one particularly interesting application, the device is contemplated to be used as an electric motor to directly drive a refrigeration unit turbo compressor at extremely high rotational speeds. These rotational speeds may be 50,000 to 100,000 RPM or more. By operating the turbo compressor at these rotational speeds, the efficiency of the compressor is substantially improved. Using conventional electric motors which operate at much slower speeds, most or all of the efficiency gain associated with the high speed turbo compressor is lost to mechanical loses associated with the gearing necessary to achieve the high rotational speed. By directly driving the compressor with a high speed motor designed in accordance with the invention, the efficiency losses associated with the conventional gear assembly are eliminated. This provides an overall arrangement that is substantially more efficient than conventional arrangements.

Although the overall amorphous metal magnetic core 36 of device 10 has been described as having an overall shape of a toroidal ring with pole projections projecting out from one of the annular surfaces of the ring as illustrated in FIG. 3A, this is not a requirement. Instead, the overall amorphous metal magnetic core may take any desired shape and still fall within the scope of the invention so long as the overall amorphous metal core is made up of a plurality of individually formed amorphous metal core pieces which are supported adjacent one another by a core housing.

Figure 8:
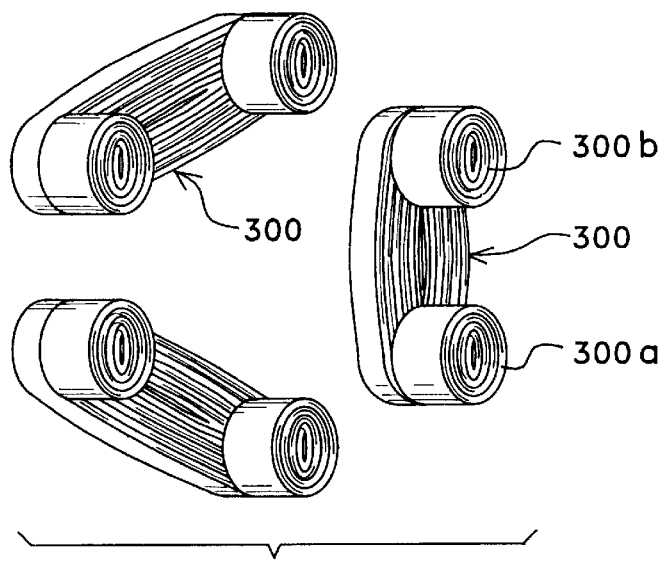
FIG. 8 is a perspective view of a second embodiment of an overall amorphous metal magnetic core designed in accordance with the present invention.

Referring to FIG. 8, the overall amorphous metal core may take the form of U-shaped overall amorphous metal cores. In one specific embodiment, three separate U-shaped overall cores 300 replace the toroidal ring configuration shown in FIG. 3A. Each core 300 is made up of three individually formed amorphous metal core pieces 300a–c. Core pieces 300a and 300b are cylindrical core pieces similar to core pieces 36a–f of FIG. 3A. However, core pieces 300c are core pieces having an elongated oval cross-sectional shape. In this embodiment, the stator housing would have core piece openings arranged such that each pair of core pieces 300a and 300b are held adjacent an associated one of core pieces 300c. The electromagnet coil array for this embodiment would be similar to that described above for device 10. The only difference between the configuration described above using the toroidal ring core piece and the U-shaped configuration is that the toroidal ring configuration magnetically couples all six of the pole pieces formed by core pieces 36a–f, whereas, in the U-shaped configuration, only each associated pair of pole pieces formed by core pieces 300a and 300b are magnetically coupled.

Figure 9:
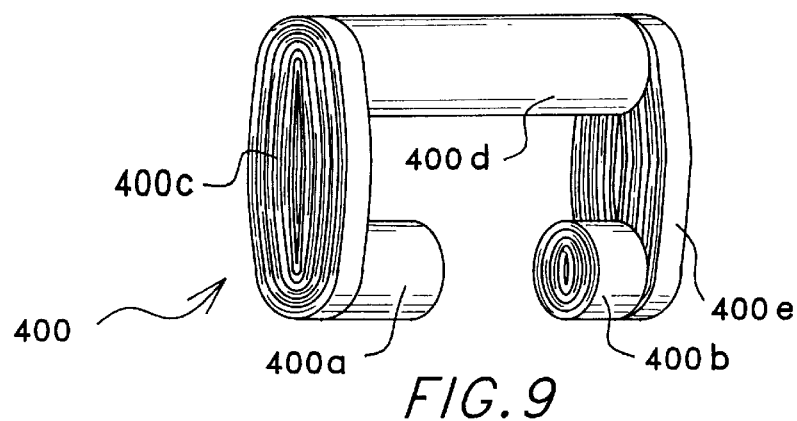
FIG. 9 is a perspective view of a third embodiment of an overall amorphous metal magnetic core designed in accordance with the present invention.

FIG. 9 illustrates another possible configuration for providing the magnetic core of the present invention. As described above, device 10 of FIG. 1 includes two stator arrangements including overall amorphous metal cores 36, one on each side of rotor arrangement 16. FIG. 9 illustrates a generally C-shaped overall amorphous metal core 400 including five individually formed amorphous metal core pieces 400a–e. The two toroidal ring overall cores of FIG. 1 may be replaced with six overall amorphous metal cores 400 positioned radially around the rotor arrangement. In this embodiment, six core pieces 400a form pole pieces similar to pole pieces 36a–f on one side of the rotor arrangement. Core pieces 400b form corresponding pole pieces positioned on the other side of the rotor arrangement. For each C-shaped overall amorphous metal magnetic core 400, core pieces 400c–e form a magnetic yoke that magnetically couples their associated core pieces 400a and 400b. Also, in this embodiment, the stator housing would be configured to support all of the various core pieces in their respective positions to form the six overall C-shaped magnetic cores. As described above with respect to the U-shaped cores, the only difference between this embodiment and the embodiment of FIG. 1 is that instead of all of the pole pieces on one side of the rotor arrangement being magnetically coupled by the toroidal ring core piece, each pair of pole pieces formed by associated core pieces 400a and 400b on opposite sides of the rotor arrangement are magnetically coupled.

Figure 10:
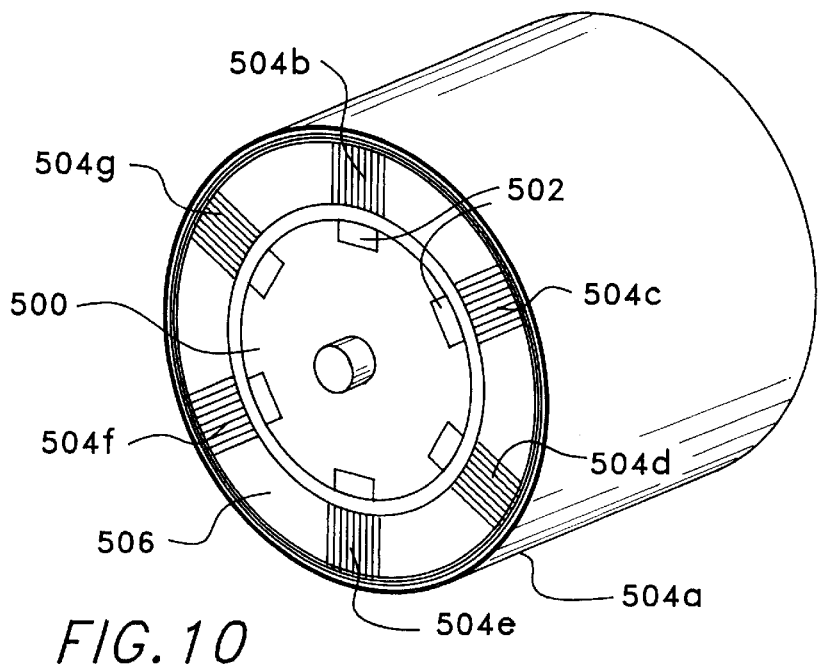
FIG. 10 is a perspective view of a fourth embodiment of an overall amorphous metal magnetic core designed in accordance with the present invention.

FIG. 10 illustrates yet another possible configuration for providing the magnetic core of the present invention. In this case the device takes the form of a barrel or radial type device rather than a disk or axial type device. In this configuration, a rotor assembly 500 would take the form of a barrel rather than a disk. In this example, if the device is a DC brushless type motor, rotor assembly 500 would included six rotor magnets 502 attached to the outer circumferential edge of the rotor assembly. Alternatively, if the device is an induction type motor, magnets 502 would not be included and rotor assembly 500 would be made up of an appropriately formed iron based material or other magnetic material core.

The stator arrangement of this barrel type embodiment includes only one overall amorphous metal core in the form of a generally tubular shaped overall amorphous metal core 504. Core 504 is made up of a tubular shaped, individually formed amorphous metal core piece 504a and six individually formed amorphous metal core pieces or teeth 504b–g. Core piece 504a is formed by rolling a continuous ribbon of amorphous metal material of a desired width into the desired diameter tube shape. Core pieces 504b–g may be formed by either stacking individual strips of amorphous metal material to form the desired core piece shape or alternatively may be formed by winding a continuous amorphous metal ribbon into a very elongated oval shape. In this embodiment, a stator housing 506 has core piece openings arranged such that each of core pieces 504b–g are held adjacent to the inner surface of core piece 504a. The electromagnet coil array for this embodiment would be similar to that described above for device 10. The only difference between the configuration described above using the toroidal ring core piece and this barrel or radial configuration is that, for the barrel configuration, the coils would be very elongated coils running longitudinally parallel with the axis of the rotor assembly and positioned around each of the core pieces or teeth 504b–g.

Although the various core pieces have been described throughout the description as having specific cross-sectional shapes, it should be understood that the invention is not limited to these specific cross-sectional shapes. Instead, as illustrated in FIGS. 11A–F, the individually formed core pieces may have any cross-sectional shape including a circle, an oval, an egg shape, a toroidal ring, a triangle having rounded corners, or a trapezoid having rounded corners as illustrated by core pieces 510, 512, 514, 516, 518, and 520 in FIGS. 11A–F respectively.

Figures 11A, 11B, 11C, 11D:
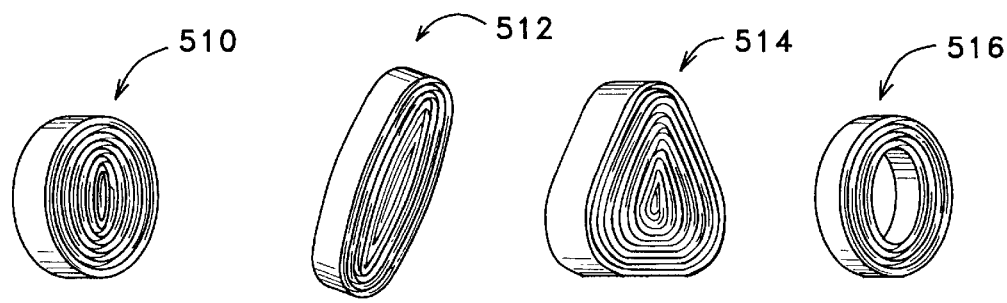
FIGS. 11A–H are diagrammatic perspective views of various embodiments of the individual amorphous metal core pieces having various cross-sectional shapes.
Figures 11E, 11F, 11G, 11H:
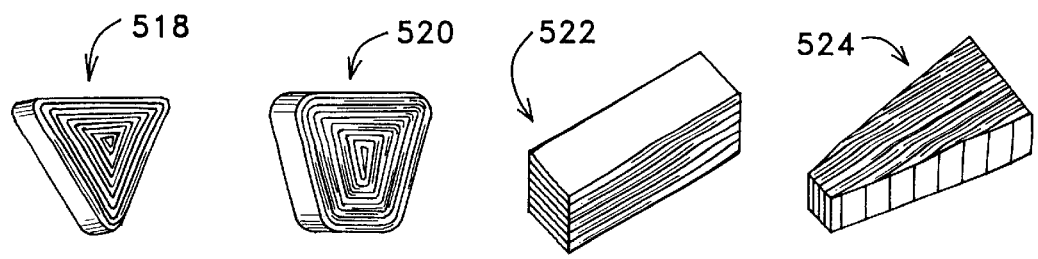

Although the core pieces have been described as being wound from a continuous ribbon of amorphous metal material, this is not a requirement. Alternatively, the core pieces may be formed by stacking individually formed strips or pieces of amorphous metal to form a core piece of a desired shape such as a rectangular core piece 522 or a trapezoidal cross-sectional shaped core piece 524, as illustrated in FIGS. 11G and 11H, or a wide variety if other particular cross-sectional shapes. As illustrated in these figures, the individual strips may be stacked atop one another with each piece being the same size and shape as indicated in FIG. 11G. Alternatively, the individual strips may be stacked beside one another with various individual pieces having different sizes and shapes as illustrated in FIG. 11H. These various approaches allow a wide variety of shapes to be formed.

As is known to those skilled in the art, when amorphous metal material is produced, it typically has a particular direction along which magnetic flux will be directed most efficiently. For a ribbon of amorphous metal material, this direction is typically either along the length of the ribbon or across the width of the ribbon. By using the appropriate approach described above to form each of the core pieces of an overall amorphous metal core, the individual core pieces may be formed such that the amorphous metal material is always oriented such that the magnetic flux is directed through the pieces along the direction of the amorphous metal material that most efficiently directs the magnetic flux. For example, in the case of the toroidal ring embodiment of FIG. 3A, toroidal ring core piece 36g would be made by winding an amorphous metal ribbon which has its most efficient flux direction aligned along the length of the ribbon. However, each of pole pieces 36a–f would be formed by winding an amorphous metal ribbon which has its most efficient flux direction aligned across the width of the ribbon. This configuration aligns the amorphous metal material such that the magnetic flux is directed through the core along the direction of the material that most efficiently directs the magnetic flux.

Although the invention has been described as a single phase device in which all of the electromagnets of the stator assembly are activated simultaneously, this is not a requirement. As would be clear to one skilled in the art, the device of the invention may also take the form of a multiphase device. FIG. 12 illustrates one approach to providing a multiphase electric motor 600. In this embodiment, three devices 10a–c designed as described above for device 10 are mounted in line on a common shaft. Each of the devices 10a–c is rotated twenty degrees relative to the previous device. In other words, device 10b is rotated twenty degrees relative to device 10a such that each of the pole pieces of the stator arrangement in device 10b is fixed in a position twenty degrees in advance of the corresponding pole pieces of the stator arrangement of device 10a. The same is true for device 10c relative to device 10b. Since the duty cycle of devices 10a–c can extend through a sixty degree arc as described earlier, this configuration causes the three devices to be out of phase with one another by one third of their duty cycle. Thus, the three devices 10a–c may be operated as an overall three phase device with each of the devices 10a–c corresponding to one phase.

Figure 13:
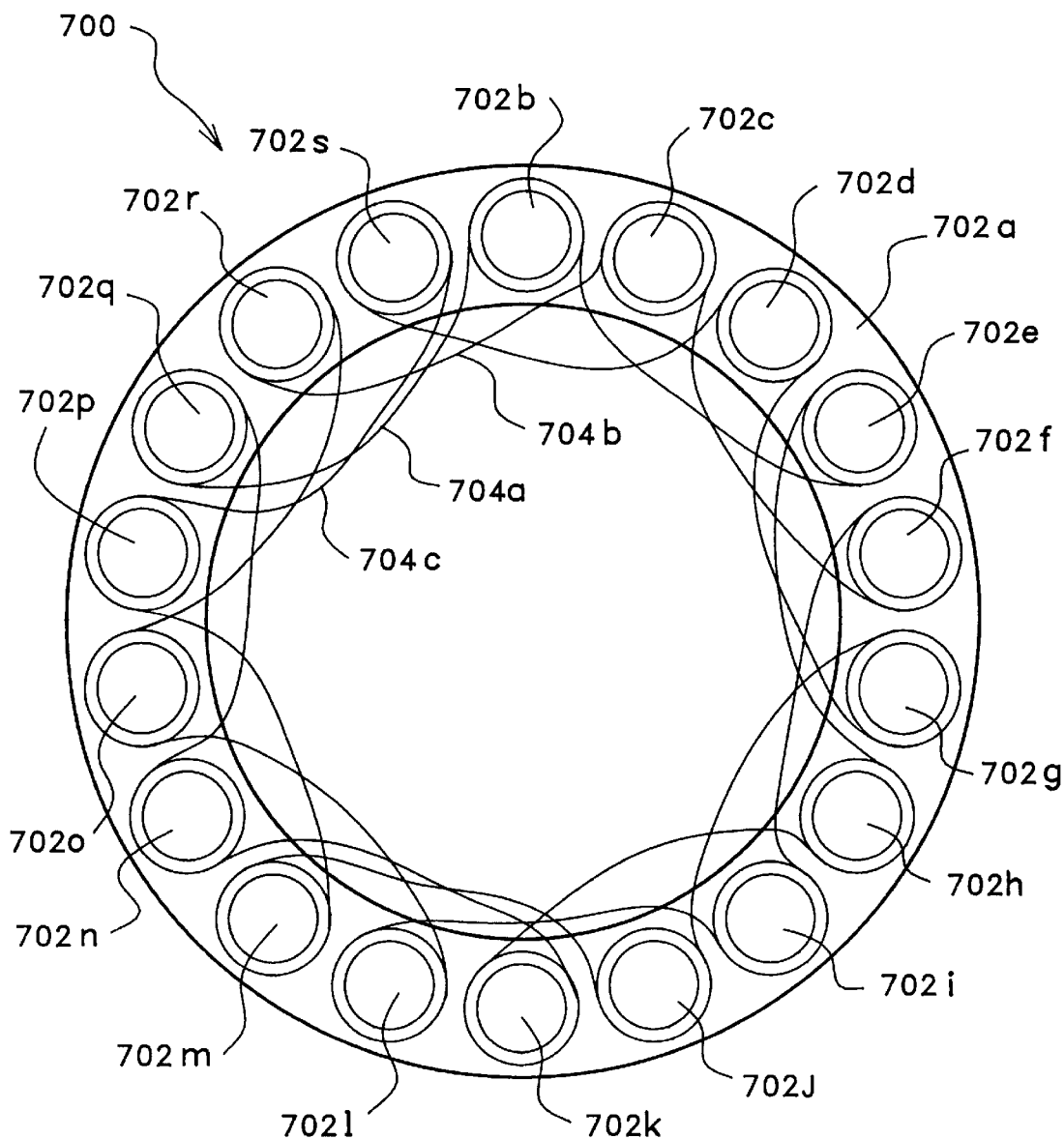
FIG. 13 is a diagrammatic plan view of a stator arrangement of another embodiment of a multiphase device designed in accordance with the present invention.

Alternatively, as illustrated in FIG. 13, a three phase device may be provided by constructing a device which includes a stator arrangement having an electromagnet assembly 700 made up of individually formed core pieces and three separately controllable coil arrays. In this example, the rotor assembly (not shown in FIG. 13) would still have six rotor magnets as was the case for device 10 of FIG. 1. Similarly, the device includes two stator arrangements with one positioned on each side of the rotor arrangement as was also the case for device 10 of FIG. 1. However, as shown in FIG. 13, which is a plan view of electromagnet assembly 700, this electromagnet assembly includes an overall amorphous metal core 702 made up of nineteen individually formed amorphous metal core pieces 702a–s. A first core piece 702a of the nineteen core pieces is a toroidal ring core piece similar to core piece 36g shown best in FIG. 3. Eighteen core pieces 702b–s are individually wound core pieces having one end positioned adjacent toroidal ring core piece 702a thereby forming eighteen pole projections. Electromagnet assembly 700 also includes three separately controllable coil arrays 704a–c. Each of the separately controllable coil arrays is similar to coil array 38 of FIG. 1 with each array including a coil wrapped around every third consecutive one of core pieces 702b–s. With this arrangement, each coil array corresponds to one of the phases of a three phase device.

Although the device has been described above as a three phase device, it should be understood that the device may alternatively be provided as a two phase device. In this case, overall amorphous metal core 702 would include thirteen core pieces rather than nineteen core pieces with twelve of the core pieces forming pole pieces and one core piece acting as the magnetic yoke as described above. Also, the two phase device would include only two individually controllable coil arrays. Furthermore, it is to be understood that the multiple phase devices are not limited to the toroidal ring core configuration described above. Instead, the core configuration may take on a wide variety of configurations and still remain within the scope of the invention.

Although the above described embodiments have been describe with the various components having particular respective orientations, it should be understood that the present invention may take on a wide variety of specific configurations with the various components being located in a wide variety of positions and mutual orientations and still remain within the scope of the present invention. For example, although each stator arrangement of device 10 was described as including six pole pieces and the rotor was described as including six magnets, this is not a requirement. Instead, the stator arrangement may have any desired number of pole pieces and the rotor any number of magnets and still remain within the scope of the invention.

Additionally, the present invention would equally apply to a wide variety of electric motors and generators so long as the stator arrangement of the device included an overall amorphous metal core made up of individually formed core pieces which are supported in place by a dielectric housing. These various generators and motors include, but are not limited to, motors and generators of the DC brushless type, DC synchronous type, variable reluctance or switched reluctance type, induction type, and many other types of generators, motors, and alternators. Therefore, the present examples are to be considered as illustrative and not restrictive, and the invention is not to be limited to the details given herein, but may be modified within the scope of the appended claims.

What is claimed is:

1. A device selected from the group of devices consisting of an electric motor, an electric generator, and a regenerative electric motor, the device including a rotor arrangement, at least one stator arrangement, and a device housing for supporting the rotor arrangement and the stator arrangement in predetermined positions relative to one another and for supporting the rotor arrangement for rotation along a predetermined rotational path about a given rotor axis, the stator arrangement comprising:

a) at least one energizable electromagnet assembly including an overall amorphous metal magnetic core and electric coil array which together define at least one magnetic pole piece, the overall amorphous metal magnetic core being made up of a plurality of individually formed amorphous metal core pieces; and b) a dielectric electromagnet housing for supporting the electromagnet assembly such that the magnetic pole pieces are positioned adjacent the rotational path of the rotor arrangement, the dielectric electromagnet housing having core piece openings formed into the electromagnet housing for holding the individually formed amorphous metal core pieces in positions adjacent to one another so as to form the overall amorphous metal magnetic core.

2. A device according to claim 1 wherein the rotor arrangement includes at least one rotor magnet having north and south poles, the rotor arrangement including means for supporting the rotor magnet for rotation about a given rotor axis such that at least one of the magnet's poles is accessible along the predetermined rotational path about the given rotor axis.

3. A device according to claim 2 wherein the rotor magnet is a rare-earth permanent magnet.

4. A device according to claim 1 wherein any voids in the core piece openings of the dielectric electromagnet housing holding the amorphous metal core pieces are filled with a dielectric oil.

5. A device according to claim 1 wherein at least some of the individually formed amorphous metal core pieces are amorphous metal windings formed from a continuos ribbon of amorphous metal.

6. A device according to claim 5 wherein the continuous ribbon of amorphous metal has a substantially constant ribbon width.

7. A device according to claim 5 wherein the amorphous metal core pieces are oil impregnated.

8. A device according to claim 1 wherein the device is a multiple phase device.

9. A device according to claim 8 wherein the multiple phase device is made up of a plurality of discrete devices mounted in line on a common shaft with each of the devices being fixed to one another such that the respective stator arrangements of the plurality of devices are held in positions that are rotated a predetermined angle about the given rotor axis relative to one another.

10. A device according to claim 1 wherein the dielectric electromagnet housing further includes coolant openings formed into the electromagnet housing for allowing a coolant fluid to be circulated through the housing.

11. A device according to claim 1 wherein the dielectric electromagnet housing further includes wiring raceway openings formed into the electromagnet housing for containing wires which interconnect the coil array.

12. A device according to claim 1 wherein the device is an induction motor.

13. A stator arrangement for use in a device selected from the group of devices including an electric motor, an electric generator, and a regenerative electric motor, the device including said stator arrangement, a rotor arrangement, and a device housing for supporting the rotor arrangement and the stator arrangement in predetermined positions relative to one another and for supporting the rotor arrangement for rotation along a predetermined rotational path about a given rotor axis, the stator arrangement comprising:

a) at least one energizable electromagnet assembly including an overall amorphous metal magnetic core and an electric coil array which together define one or more magnetic pole pieces, the overall amorphous metal magnetic core being made up of a plurality of individually formed amorphous metal core pieces; and b) a dielectric electromagnet housing for supporting the electromagnet assembly such that the one or more magnetic pole pieces are positionable adjacent the rotational path of the rotor arrangement, the dielectric electromagnet housing having core piece openings formed into the electromagnet housing for holding the individually formed amorphous metal core pieces in positions adjacent to but unconnected from one another so as to form the overall amorphous metal magnetic core.

14. A stator arrangement according to claim 13 wherein said core pieces include at least one pole piece having first and second ends and a yoke which are held within said housing openings such that the first end of said pole piece is positioned adjacent to and in confronting relationship with said yoke and the second end project out therefrom.

15. A stator arrangement according to claim 13 wherein said core pieces include a plurality of pole pieces each having first and second ends and a yoke, all of which are held within said housing openings such that the first end of each said pole pieces is position adjacent to and in confronting relationship with said yoke and the second end of each pole piece projects out therefrom.

16. A stator according to claim 15 wherein each of said pieces is an amorphous metal winding formed from a continuous ribbon of amorphous metal having opposite edges such that said opposite edges form the first and second ends of the pole piece.

17. A stator according to claim 16 wherein said yoke is an amorphous metal winding formed from a continuous ribbon of amorphous metal having opposite edges which define opposite yoke surfaces and wherein the first end of each of said pole pieces is held by said housing adjacent to and in confronting relationship with one of said yoke surfaces.

18. A stator according to claim 15 wherein at least some of the individually formed amorphous metal core pieces are made a of a stack of individual strips of amorphous metal material cut to form a predetermined shape.

19. An amorphous metal core for use as part of a stator arrangement which in turn can be used in a device selected from the group of devices including an electric motor, an electric generator, and a regenerative electric mower, the device including said stator arrangement, a rotor arrangement, and a device housing for supporting the rotor arrangement and the stator arrangement in predetermined positions relative to one another and for supporting the rotor arrangement for rotation along a predetermined rotational path about a given rotor access, the amorphous metal core comprising:

a) a plurality of individually formed amorphous metal core pieces including one or more thereof which serve as pole pieces when combined with cooperating electric coils; and b) a dielectric electromagnet housing for supporting the core pieces in adjacent unconnected relationship with one another such that the one or more magnetic pole pieces which are formed when combined with the cooperating electric coils are positionable adjacent the rotational path of the rotor arrangement, the dielectric electromagnet housing having core piece openings formed into the electromagnet housing for hold the individually formed amorphous metal core pieces in said adjacent but unconnected relationship with one another.

20. An amorphous metal core according to claim 19 wherein said core pieces include at least one pole piece having first and second ends and a yoke which are held within said housing openings such that the first end of said pole piece is positioned adjacent to and in confronting relationship with said yoke and the second end projects out therefrom.

21. A method of making an overall amorphous metal magnetic core for an electromagnet assembly of a device selected from the group of devices consisting of an electric motor, an electric generator, and a regenerative electric motor, the method comprising the steps of:

a) forming a plurality of individually formed amorphous metal core pieces, each having a desired core piece shape;

b) providing a dielectric magnet core housing including magnetic core piece openings that define the desired overall magnetic core shape; and c) assembling the plurality of individually formed amorphous metal core pieces into the core piece openings of the dielectric magnetic core housing such that the dielectric core housing holds the core pieces adjacent to one another so as to form the desired overall magnetic core shape.

22. A method according to claim 21 further including the step of filling any voids in the core piece openings of the magnetic core housing with a dielectric oil.

23. A method according to claim 21 wherein the step of forming a plurality of individually formed amorphous metal core pieces having a desired core piece shape includes the step of forming at least some of the amorphous metal core pieces by winding a continuous ribbon of amorphous metal material into a coil having a desired cross-sectional shape.

24. A method according to claim 23 wherein the step of forming a plurality of individually formed amorphous metal core pieces having a desired core piece shape includes the step of oil impregnating the amorphous metal core pieces.

25. A method according to claim 23 wherein the continuous ribbon of amorphous metal material is not cut, etched, or otherwise machined other than cutting the continuous ribbon of amorphous metal material to the desired length.

26. A method according to claim 21 wherein the step of forming a plurality of individually formed amorphous metal core pieces having a desired core piece shape includes the step of forming at least some of the individually formed amorphous metal core pieces by stacking individual strips of amorphous metal material cut to form a desired shape to form the core piece.

* * * * *